Patented Aug. 22, 1950

2,519,906

UNITED STATES PATENT OFFICE 2,519,906

PRODUCTION OF LACTIC ACID ESTERS

Howard M. Hodge, Linthicum Heights, Md., assignor to U. S. Industrial Chemicals, Inc., New York, N. Y., a corporation of Delaware No Drawing. Application May 26, 1947, Serial No. 750,645

6 Claims. (Cl. 260—484)

This invention relates to a method for the production of esters of lactic acid from concentrated fermentation products containing lactic acid.

Methods for the fermentation to lactic acid of molasses, sugar or starch solutions, etc. have been well worked out in the art, and result in the production of almost one pound of lactic acid per pound of fermentable sugars contained in the medium fermented. However, the cost of lactic acid to the user thereof is markedly higher than the cost of the sugars fermented to produce the lactic acid, due primarily to the difficulties encountered in obtaining the lactic acid in commercially acceptable purity from the fermented mixture. Thus, it is known to recover lactic acid by passing vapors of lower alcohols through a lactic acid fermentation solution under esterifying conditions to produce a condensate containing lactic acid esters, Ind. Eng. Chem., vol. 28, 228 (1946). The lactic acid esters as such or lactic acid itself may be recovered from such condensates in accordance with known procedures. Such as esterification procedure is, however, not an entirely satisfactory one for the recovery of lactic acid from a fermentation solution derived from molasses, especially black-strap, primarily because the removal of the lactic acid and water from the spent mash sets it up into a tarry mass which cannot be handled in any known type of reaction vessel. Not only is such a solid impractical to handle, but it becomes a problem to dispose of such fermentation residues. Indeed, the commercial practicability of a fermentation process may turn on the ready disposability of the residue. In addition, such a procedure is of necessity accompanied by severe acid-corrosion conditions, regardless of the medium from which the lactic acid is derived.

It is therefore an object of this invention to provide an improved method for the production of lactic acid esters from concentrated spent fermentation solutions containing lactic acid.

It is also an object of this invention to provide an improved method for the production of lactic acid esters from concentrated spent fermentation solutions derived from molasses and containing lactic acid.

It is a further object of this invention to provide a process for the production of lactic acid esters from concentrated spent fermentation solutions containing lactic acid in which the problem of disposal of the non-volatile residue resulting from the process is alleviated.

In addition, it is an object of this invention to provide a process for the production of lactic acid esters from concentrated spent fermentation solutions containing lactic acid in which the tendency to corrosion is lessened.

The foregoing and other objects are accomplished in accordance with this invention by contacting under esterifying conditions a vapor of a saturated aliphatic monohydric alcohol containing from one to three carbon atoms with an adsorbent material impregnated with an acidified, concentrated spent fermentation solution containing lactic acid. The foregoing procedure results in the production of a product containing the corresponding alcohol esters of lactic acid, from which product the lactic acid may be recovered, if desired, in accordance with conventional procedures.

The following examples illustrate in detail the practice of the present invention, and are to be considered not limitative thereof.

Example No. 1

The apparatus consisted of a one-gallon methanol vaporizer; a methanol superheater made of coiled ¼-inch metal tubing; a 36-inch long jacketed stillpot of 2½-inch pipe, the bottom of which was connected with the exit of the superheater; and a vapor outlet line connected to a stainless-steel condenser made of ¾-inch pipe.

1335 gms. of a lactic acid concentrate (obtained from the fermentation of molasses and containing 26.34 gms. of lactic acid per 100 gms. of concentrate) and 104 gms. of concentrated commercial sulfuric acid (94%) were mixed with 445 gms. of peanut hulls (one gallon volume) and dried on a pan drier until the mass weighed 1160 gms. 665 gms. of water was lost during the drying. 780 gms. of the dried mixture containing 236.41 gms. of lactic acid was charged to the still, and 3000 ml. of methanol was vaporized and passed therethrough under the following conditions: steam pressure in the stillpot jacket, atmospheric; methanol vapor temperature at the inlet to the still, 120–150° C.; vapor temperature at the outlet from the still, generally about 80° C.; and rate of vaporization of methanol, 1000 ml. per hour.

The distillate obtained by means of the foregoing procedure amounted to 3080 ml. and contained 217.12 gms. of methyl lactate calculated as lactic acid (91.8% recovery). The first portion of the distillate (6.5% thereof) was straw-colored, while the remainder of the distillate had a very slight trace of color. The residue remaining in the still was friable and dry, and was easily removed.

Example No. II

The apparatus employed in this example was the same as that used in Example I. However, in this experiment the stillpot or column was filled with 385 gms. of peanut hulls, and then flooded with a mixture containing 3975 gms. of a lactic acid concentrate (derived from molasses and containing 31.86% of lactic acid) and 165 ml. of concentrated commercial sulfuric acid. The column was then drained. 1100 gms. of the liquid mixture was retained on the hulls, giving a charge thereto of 324 gms. of lactic acid. 5000 ml. of methanol were vaporized and put through the bed of peanut hulls under conditions similar to those which obtained in Example I.

By means of this procedure there was recovered a distillate amounting to 5100 ml. and containing 307.48 gms. of methyl lactate calculated as lactic acid (94.9% yield). As in Example I the residue was easily removed from the still.

Example No. III

The apparatus consisted of a 1000 ml. methanol vaporizer, a methanol superheater made of a small coil of tubing heated by a Bunsen burner and connected with the base of a 10-inch long, jacketed stillpot made of 2-inch pipe immersed in an oil bath, and a glass condenser connected with the top of the stillpot.

A mixture consisting of 300 ml. of a lactic acid concentrate (obtained from a molasses fermentation and analyzing 51% water and 29.67% lactic acid by analysis after ether extraction) and 15 ml. of concentrated commercial sulfuric acid was mixed with and dried on 150 gms. of peanut hulls at 80° C. overnight. 115 gms. of water was lost during the drying. An identical quantity of the same mixture of concentrate and sulfuric acid was then mixed with the already impregnated hulls, and dried for 24 hours at 80° C. The entire charge containing 178.02 gms. of lactic acid was placed in the stillpot (depth about 10"), and 2000 ml. of methanol was vaporized and passed therethrough under the following conditions: temperature of methanol vapors entering the stillpot, 120–130° C.; temperature of the vapors leaving the still pot, 95–102° C.; and temperature of the oil bath surrounding the bottom 6" of the stillpot, 140° C.

By means of the foregoing procedure there was obtained 1981 ml. of condensate containing 92% of the lactic acid charged to the stillpot in the form of methyl lactate. The residue remaining in the still pot was easily removed, and was friable and dry.

Example No. IV

The apparatus used was identical with that employed in Example I. 2000 gms. of a lactic acid concentrate (obtained from molasses and containing 34.4% of lactic acid and 47.0% of water) was evaporated under a vacuum until 330 ml. of water was removed therefrom. 206 gms. of commercial concentrated sulfuric acid (30% on the basis of the lactic acid) was then added to the concentrate, and 1600 gms. of this mixture was impregnated on 250 gms. of peat moss, giving a total of 1850 gms. of peat moss-lactic acid concentrate mixture. 1700 gms. of this mixture was charged to the stillpot.

The following conditions were maintained during the recovery of the lactic acid from the peat moss-concentrate mixture: steam pressure in the jacket, atmospheric; methanol vapor temperature at the inlet to the stillpot, 145–155° C.; and vapor temperature at the outlet from the stillpot, 80–90° C.

By means of the foregoing procedure there was obtained over a period of about six hours a condensate amounting to 8163 ml. and containing 506.39 gms. of methyl lactate calculated as lactic acid (a 94% yield based upon the 539.25 gms. of lactic acid in the charge). The residue remaining in the stillpot was somewhat gummy and was considerably more difficult to remove than those of Examples I–III.

The foregoing examples illustrate specific embodiments of the method of this invention for the production of esters of lactic acid by contacting under esterifying conditions a vapor of a saturated aliphatic monohydric alcohol containing from one to three carbon atoms with an adsorbent material impregnated with an acidified, concentrated spent fermentation solution containing lactic acid. In place of the concentrated spent fermentation solution derived from molasses employed in the examples, there may be substituted fermentation products containing lactic acid derived from a wide variety of sources, such as pure sugars and starches, syrups, grain mashes, etc. Suitable concentrated solutions may be obtained by acidifying with sulfuric acid a lactic acid beer, centrifuging out any precipitates formed, and then evaporating the beer in order to concentrate it. However, the method described herein is of particular advantage in the recovery of lactic acid in the form of an ester thereof from a product obtained by the fermentation of molasses, such as high-test or blackstrap mollasses, since such residues are the most difficult to handle upon removal therefrom of lactic acid and water. In the interest of heat economy, the crude fermentation residue when impregnated on the adsorbent should be as highly concentrated as possible, consistent with ease of handling. As a result, the concentrations of water, lactic acid and other materials in the concentrated fermentation product may vary widely, depending primarily upon the source (molasses, pure sugar, etc.) from which the concentrate is derived. When a concentrate derived from molasses is employed, such concentrate should preferably cotain less than about 40% water by weight.

Furthermore, various adsorbents may be employed as carriers for the concentrated fermentation residue in place of the peanut hulls and peat moss used in the examples. Such suitable alternative adsorbents are those which are naturally occurring and are of vegetable origin, such as cotton seed hulls, ground corn cobs, straw, bagasse, etc. In addition, as the examples illustrate, the adsorbent may be impregnated with the fermentation product in various ways, such as a one-step impregnation with (Example I) or without (Example II) a subsequent drying step, or a several-step impregnation (Example III). Other methods of effecting the impregnation of the adsorbent will suggest themselves.

The removal of the lactic acid from the impregnated adsorbent is effected by the mechanism of esterification. Although methyl alcohol is the preferred esterifying alcohol because of its low cost, there may be substituted therefor any saturated aliphatic monohydric alcohol containing from one to three carbon atoms, such as ethyl alcohol, isopropyl alcohol, etc. The amount of alcohol required for the esterification will depend upon the particular conditions encountered, such as the amount of lactic acid to be recovered, upon the esterification temperature, upon the particular esterification catalyst employed and the concentration thereof, upon the particular adsorbent used, and upon other factors. The esterification is conducted with the esterifying alcohol in the vapor phase, and may be effected over a wide range of temperatures. Thus esterification temperatures within the range from about 70° to about 150° C. and higher may be advantageously used, with temperatures within the range from about 80° to about 110° C. being preferred.

As the examples illustrate, the lactic acid esterification is effected with the aid of a catalyst. Sulfuric acid, which was used in the examples, is the preferred catalyst, because it is inexpensive and is very effective, and when used should preferably be present in at least 20% concentration, based upon the amount of lactic acid contained in the fermentation product retained on the carrier, although lesser amounts may be used. Phosphoric acid might be used if economic conditions permit.

The foregoing procedure is an advantageous method for the recovery of lactic acid from concentrated fermentation products containing the same, the lactic acid being recovered in the form of an ester thereof. The product obtained as a result of the recovery is of good quality, and can be distilled to recover the lactic acid esters or hydrolyzed to obtain lactic acid, in accordance with procedures which are well understood in the art and form no part of the present invention. Furthermore, the residue remaining in the reaction vessel is more easily handled than the residue obtained from a similar product in accordance with prior art procedures and, especially when derived from molasses, can be neutralized with lime, chalk, ammonia vapors (in situ), etc. to yield a product which is useful as a fertilizer. It is this prospective use that calls for limitation of the catalyzing acids to sulfuric and phosphoric. Residue produced from a process so catalyzed is not harmful to plant life. If phosphoric acid is used, the catalyst is a plant nutrient. In addition, the presence of the carrier enables the method of this invention to be practiced under less corrosive conditions than those which exist under the corresponding methods of the prior art.

I claim:

1. The method for the preparation of lactic acid esters which comprises contacting under esterifying conditions a vapor of a saturated aliphatic monohydric alcohol containing from one to three carbon atoms with an adsorbent material of vegetable origin selected from the group consisting of peanut hulls, peat moss, cotton seed hulls, ground corn cobs, straw and bagasse impregnated with a concentrated spent fermentation solution containing lactic acid and being derived from molasses, said solution having been acidified with a material selected from the group consisting of sulfuric acid and phosphoric acid.

2. The method for the preparation of lactic acid esters which comprises contacting at a temperature within the range from about 70 to about 150° C. under esterifying conditions a vapor of a saturated aliphatic monohydric alcohol containing from one to three carbon atoms with an adsorbent material of vegetable origin selected from the group consisting of peanut hulls, peat moss, cotton seed hulls, ground corn cobs, straw and bagasse impregnated with a concentrated spent fermentation solution containing lactic acid and being derived from molasses, said solution having been acidified with a material selected from the group consisting of sulfuric acid and phosphoric acid.

3. The method for the preparation of lactic acid esters which comprises contacting under esterifying conditions a vapor of a saturated aliphatic monohydric alcohol containing from one to three carbon atoms with an adsorbent material of vegetable origin selected from the group consisting of peanut hulls, peat moss, cotton seed hulls, ground corn cobs, straw and bagasse impregnated with a concentrated spent fermentation solution containing lactic acid and being derived from molasses, said solution having been acidified with sulfuric acid.

4. The method for the preparation of methyl lactate which comprises contacting under esterifying conditions methyl alcohol vapors with an adsorbent material of vegetable origin selected from the group consisting of peanut hulls, peat moss, cotton seed hulls, ground corn cobs, straw and bagasse impregnated with a concentrated spent fermentation solution containing lactic acid and being derived from molasses, said solution having been acidified with sulfuric acid.

5. The method for the preparation of lactic acid esters which comprises contacting under esterifying conditions a vapor of a saturated aliphatic monohydric alcohol containing from one to three carbon atoms with peanut hulls impregnated with a concentrated spent fermentation solution containing lactic acid and being derived from molasses, said solution having been acidified with a material selected from the group consisting of sulfuric acid and phosphoric acid.

6. The method for the preparation of lactic acid esters which comprises contacting under esterifying conditions methyl alcohol vapors with peanut hulls impregnated with a concentrated spent fermentation solution containing lactic acid and being derived from molasses, said solution having been acidified with sulfuric acid.

HOWARD M. HODGE.

REFERENCES CITED

The following references are of record in the file of this patent:

UNITED STATES PATENTS

| Number | Name | Date |
|---|---|---|
| 2,334,524 | Wenker | Nov. 16, 1943 |
| 2,420,234 | Filachione et al. | May 6, 1947 |